Patented July 7, 1953

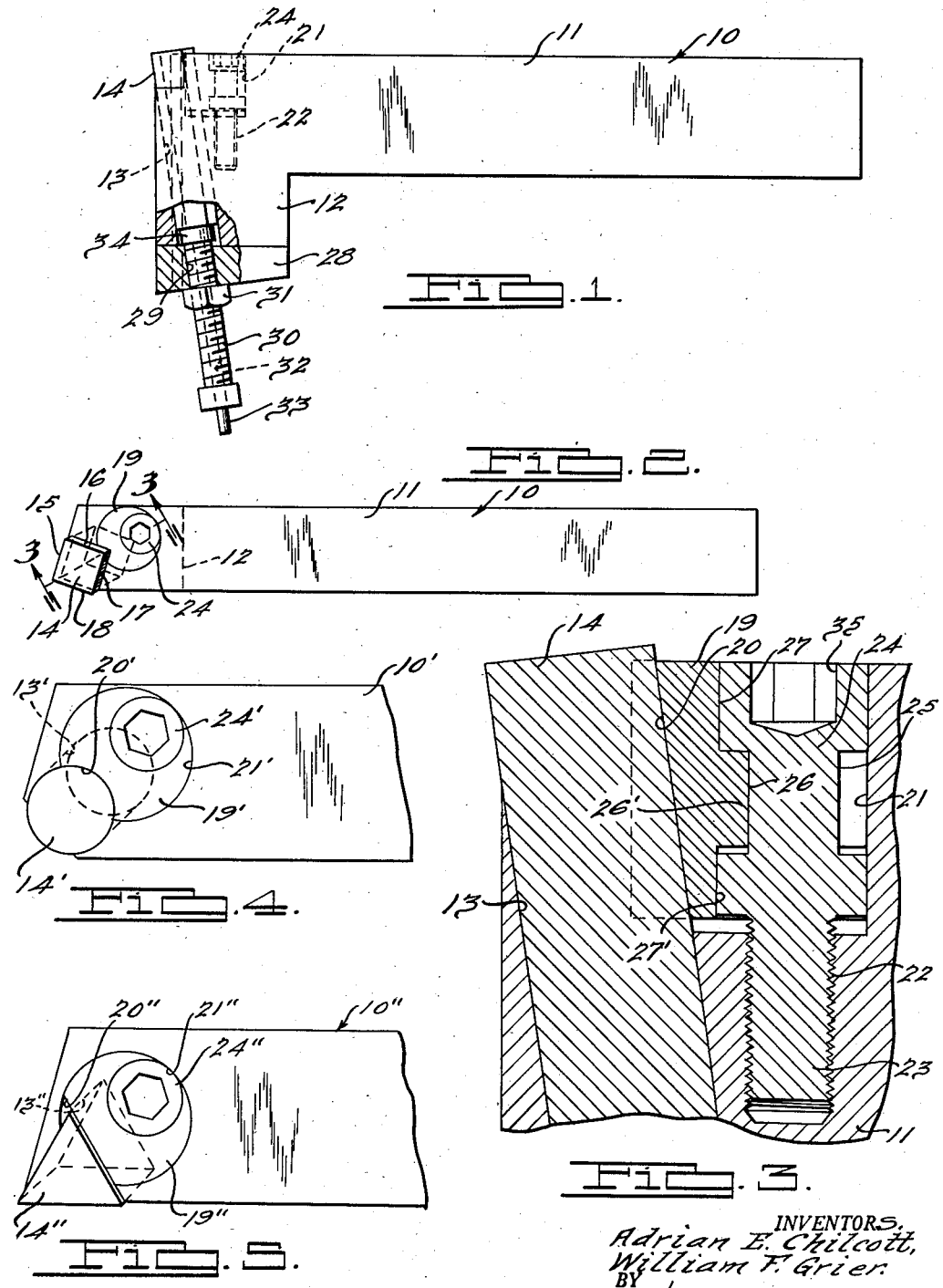

2,644,224

UNITED STATES PATENT OFFICE 2,644,224

TOOLHOLDER

Adrian E. Chilcott, Detroit, and William F. Grier, Royal Oak, Mich., assignors to Chrysler Corporation, Highland Park, Mich., a corporation of Delaware Application May 16, 1950, Serial No. 162,338

4 Claims. (Cl. 29—96)

Our invention relates to a cutting device and more particularly to an improved tool holder for a lathe and similar cutting machinery.

In the past, a great deal of trouble had been encountered in removing the tool from the tool holder of a lathe or other cutting machinery without removing the holder from the lathe due to the inaccessibility of the tool retaining means of the holder as well as the inability of the operator to manually remove the tool after it has been loosened. This condition is particularly troublesome when a plurality of tools are arranged close together for performing multiple cutting operations. It is a principal object of the present invention to provide a tool holder with tool retaining means which is readily accessible to the operator of the lathe without removing the holder from the lathe.

Another object of our invention is to provide a lathe tool holder with means for ejecting the tool to a position where it is easily removable from the holder by the operator of the lathe.

A further object of our invention is to provide a tool holder with an improved tool holding means for more rigidly securing the tool within the holder.

Still another object of our invention is to provide an improved lathe tool holder which is characterized by simplicity in structure as well as ease of manufacture.

Other objects and advantages will become more apparent from the following description of several embodiments of our invention, reference being had to the accompanying drawings in which:

Fig. 1 is a side elevational view of a lathe tool holder and tool assembly embodying our invention.

Fig. 2 is a plan view of the tool holder and tool assembly shown in Fig. 1.

Fig. 3 is an enlarged fragmentary sectional view showing the lathe tool and its associated holding means.

Fig. 4 is a fragmentary plan view similar to Fig. 2 illustrating a modification of our invention.

Fig. 5 is a fragmentary plan view similar to Fig. 2 illustrating another modification of our invention.

In Figs. 1 and 2 we have shown a lathe tool holder, generally designated by the numeral 10, including an elongated base portion 11 having a depending section 12 at one end thereof. The section 12 is provided with a passage 13 of square cross sectional configuration which receives a tool 14 therein. The tool 14 is of the standard cutting type, as, for example, carbide steel, and is similarly of a square cross sectional configuration. The tool 14 is provided with longitudinal faces 15, 16, 17 and 18, faces 15 and 18 engaging converging walls of the passage 13 adjacent the end portion of the holder while the faces 16 and 17 have portions engaging a wedge member 19. The wedge member 19 comprises a generally cylindrical body portion having a V-shaped groove 20 in its left side extending at an inclination to the axis of the body portion. Formed in the opposite side of the body portion of the wedge 19 is a U-shaped slot 26 which is enlarged at its upper and lower ends to provide recesses 27 and 27' and an intermediate web 26'.

The groove 20 receives the juncture or corner of the faces 16 and 17 of the tool and wedgingly urges it downwardly and leftwardly, as viewed in Fig. 1, so that the faces 15 and 18 of the tool engage the aforementioned converging walls of the passage 13. The holder 10 is provided at its upper surface, as viewed in the drawings, with a substantially cylindrical opening 21 which receives the wedge member 19. The holder is also provided with a threaded opening 22 which extends transversely of the holder from the bottom wall of the cylindrical opening 21 in parallel relation to the axis of the body portion of the wedge and which receives a threaded portion 23 of a bolt 24. The bolt 24 is provided with a circular groove 25 intermediate its threaded portion and the opposite head end thereof for receiving the web 26' of the wedge member 19. The opening 27 in the wedge member 19 is so constructed as to allow the entrance of the bolt 24 when the wedge member and bolt are not disposed within the holder 10. As shown more clearly in Fig. 3, the web 26' is disposed in the recess 25 of the bolt 24 so that the wedge 19 will move upwardly or downwardly in response to rotation of the bolt 24 within the threaded aperture 22 of the section 12. The line of movement of the bolt 24 is substantially perpendicular to a line running longitudinally of the base portion 11 while the line of movement of the tool 14 intersects the aforementioned line of movement of the bolt 24 and the wedge 19 at an acute angle so that the tool 14 is tilted leftwardly as shown in the drawings to place the upper edge of the tool in a cutting position. The lines of movement of the tool 14 and the wedge member 19 must necessarily be at an angle to afford wedging movement between them. In this respect, the groove 20 in the wedge member 19 is made so that the converging faces of the groove are parallel to faces 16 and 17 of the tool in order that the entire wedging surface of the member 19 engages the tool.

The passage 13 in the section 12 of the holder is cut away at the upper portion of the section to allow the tool to extend outwardly therefrom so that proper cutting by the tool may be accomplished. The passage 13 extends entirely through the section 12 to the lower end thereof which is capped with a block 28. The block 28 is welded or in some other conventional manner secured to the lower end of the section 12 and is provided with a threaded aperture 29 which communicates and is aligned with the passage 13 in the section 12. The block 28 is provided with a bolt 30 which is threaded into the aperture 29 and which may have one end thereof moved into the lower end of the passage 13 in response to rotation of the bolt 30. The bolt 30 is utilized to position the tool 13 within the passage and may be locked in place by a nut 31.

The bolt 30 is provided with a longitudinally extending passage 32 which receives a rod 33. The rod 33 extends outwardly of the lower end of the bolt 30 and at the upper end thereof is secured to a disc 34. The disc 34 forms the supporting floor for the tool 14 but is disposed between the lower surface of the tool and the upper surface of the bolt 30 and is carried entirely by the bolt 30. The rod 33 and the disc 34 act as ejecting means for urging the tool 14 outwardly of the passage 13 in response to manual upward movement of the rod.

The upper end of the bolt 24 is provided with a socket 35 for receiving a wrench as for example, an Allen head wrench, for rotating the bolt 24 and moving the wedge member 19 inwardly and outwardly of the opening 21.

The tool 14 as shown in Figs. 1-3, may be disposed in our improved holder in a plurality of positions. This tool is provided with eight cutting tips and each may be placed in position to perform the cutting operation. The tool 14 as shown, illustrates the cutting tip formed by the faces 15 and 18 and the upper end surface of the tool. In this position, the walls of the groove 20 in the wedge member 19 engage the faces 16 and 17 to wedgingly urge the faces 15 and 18 against the adjacent walls of the passage 13. Since the tool 14 is of a square cross sectional configuration, it may be removed from the holder, rotated, and replaced so that the walls of the groove 20 engage another pair of adjacent converging faces of the tool 14 and another cutting tip is moved into position. After the four cutting tips of the upper end of the tool have been dulled, the tool may be removed, turned upside down and the four cutting tips at the lower end may be employed.

The adjustable bolt 30 not only accommodates the use of tools which are originally of different lengths but also accommodates the use of tools which have been resharpened and consequently shorter than originally used. It has been found expedient to place the cutting tip of the tool adjacent the upper surface of the holder. With the tool in this position, the operator often finds it difficult to grip and hold on to the upper end of the tool long enough to remove it. In accordance with our invention, the tool may be easily removed, after the wedge member has been loosened, by merely pushing the rod 33 upwardly. In this manner, the tool 14 is raised sufficiently for the operator of the lathe to maintain a firm hold on the tool.

In Fig. 4 we have shown a modification of our invention which employs a tool 14' of cylindrical configuration. The tool 14' is disposed within a cylindrical passage 13' which is formed in one end of a tool holder 10'. The holder 10' is also provided with a cylindrical opening 21' which receives a wedge member 19'. The wedge member 19' is adjustably secured to the holder by a bolt 24' and is provided with a concave surface 20' which engages and wedgingly urges the tool 19' against the opposite wall of the passage 13'. Except for the cylindrical passage 13', the cylindrical tool 14' and the concave surface 20', the structure shown in Fig. 4 is identical to the structure shown in Figs. 1 to 3 and all structure not shown in Fig. 4 but shown in Figs. 1 to 3 should be applied thereto. It will be noticed also that the tool 14' need be rotated only slightly to produce a new cutting edge of the tool without removing it from the holder, and that both ends of the tool may be used to perform cutting operations by removing the tool and reversing it in position.

In Fig. 5 we have shown another modification of our invention which employs a tool 14'' of triangular cross sectional configuration. The tool 14'' is disposed within a passage 13'' of triangular cross sectional configuration which is formed in one end of a tool holder 10''. The passage 13'' is provided with converging walls adjacent the lower left hand edge of the holder as seen in Fig. 5 so that the cutting tip of the tool will protrude from the holder in the same manner as shown in Figs. 1-4. The holder 10'' is also provided with a cylindrical opening 21'' which receives a wedge member 19''. The wedge member 19'' is adjustably secured to the holder by a bolt 24'' and is provided with a stopping face 20'' which is parallel to the face of the tool 14'' that it engages. The face 20'' of the wedge member wedgingly engages one side face of the tool 14'' and urges the other two side faces of the tool into engagement with the aforementioned walls of the passage 13''. Except for the passage 13'' and the tool 14'', both of triangular cross sectional configuration as well as the sloping face of the wedge member, the structure shown in Fig. 5 is identical to the structure shown in Figs. 1 to 4 and all structure not shown in Fig. 5 but shown in Figs. 1 to 4 should be applied thereto. It will be noted that the tool 14'' may be removed, rotated or turned upside down and replaced in the same manner as the tool 14 shown in Figs. 1 to 3.

In the more narrow aspects of our invention, it may be seen that all forms of our structure are more particularly adapted for use where a plurality of the tool holders are disposed in a line for a multiple cutting operation. This is true due to the convenient location on the top of the holders of the wrench receiving socket 35 in the bolt 24. A wrench may be readily applied to the holders for the purpose of changing, rotating or inverting the tools without removing the holders from the lathe.

Although our invention has been illustrated as embodied in a lathe tool, it should be understood that it is adapted for use in tools of other cutting machinery, such as shapers and planers.

While we have illustrated and described but several embodiments of our invention, it is to be understood that such is for the purpose of illustration only, and it is contemplated that those skilled in the art may modify certain details without departing from the spirit or scope of the invention as defined in the claims appended hereto.

1. A holder for a machine tool comprising a base portion having a tool receiving passage at one end thereof, a wedge member for wedgingly retaining said tool within said passage, means on said base portion for releasably clamping said wedge member against said tool, tool positioning means adjustably mounted on said base portion and extending into said tool receiving passage, and tool ejecting means mounted on said base portion and shiftable relative to said positioning means for urging said tool away from said positioning means and outwardly of said passage.

2. A holder for a machine tool comprising a base portion having a tool receiving passage for receiving a tool and accommodating lengthwise movement thereof in a predetermined path, a wedge member adapted to engage said tool to wedgingly retain said tool within said holder, means on said base portion for releasably clamping said wedge member against said tool and for shifting said wedge member in a path at an angle to said first mentioned path, and tool positioning means adjustably mounted on said base portion and extending into said tool receiving passage including a longitudinally shiftable tool ejecting member having an end portion disposed between said tool and said tool positioning means and having an opposite end portion exposed for manual manipulation.

3. A holder for a machine tool comprising a base portion having a tool receiving passage, means connected to said base portion for holding said tool in the passage, a tool positioning member adjustably mounted on said base portion and extending into said tool receiving passage, said member being provided with a longitudinally extending passage which communicates with said first mentioned passage and tool ejecting means having portions shiftably disposed in the passage in said tool positioning member and having a tool seat secured thereto and disposed above said member.

4. A holder for a machine tool comprising a base portion having a tool receiving passage, means adapted to engage said tool to retain the tool within said holder, a bolt threaded into said holder and movable into said passage for positioning said tool, said bolt having a longitudinally extending passage extending therethrough which communicates with said tool receiving passage, and ejector means including a rod shiftably disposed in the passage of said bolt.

ADRIAN E. CHILCOTT.
WILLIAM F. GRIER.

References Cited in the file of this patent

UNITED STATES PATENTS

| Number | Name | Date |
|---|---|---|
| 945,675 | Barnes | Jan. 4, 1910 |
| 1,056,089 | Conklin et al. | Mar. 18, 1913 |
| 1,970,016 | Morton | Aug. 14, 1934 |
| 2,374,625 | Stettengren | Apr. 24, 1945 |
| 2,378,094 | Nunes-Vaz | June 12, 1945 |
| 2,382,911 | Pringle | Aug. 14, 1945 |
| 2,584,505 | Severson | Feb. 5, 1952 |

FOREIGN PATENTS

| Number | Country | Date |
|---|---|---|
| 7,708 | Sweden | Apr. 3, 1897 |
| 12,781 | Great Britain | Mar. 16, 1911 |
| 76,590 | Switzerland | Jan. 16, 1918 |
| 318,033 | Great Britain | Aug. 29, 1929 |
| 398,916 | Great Britain | Sept. 28, 1933 |
| 545,568 | Great Britain | June 2, 1942 |